(12) United States Patent
McCartie et al.

(10) Patent No.: US 8,799,801 B2
(45) Date of Patent: Aug. 5, 2014

(54) INTERACTIVE TICKER

(75) Inventors: Jonathan Paul McCartie, Los Angeles, CA (US); George Allen Rothrock, San Diego, CA (US); Nicholas Andrew Glassman, Venice, CA (US)

(73) Assignee: QUALCOMM Incorporated, San Diego, CA (US)

( * ) Notice: Subject to any disclaimer, the term of this patent is extended or adjusted under 35 U.S.C. 154(b) by 848 days.

(21) Appl. No.: 12/015,037

(22) Filed: Jan. 16, 2008

(65) Prior Publication Data

US 2009/0183103 A1 Jul. 16, 2009

(51) Int. Cl.
*G06F 3/048* (2013.01)
*G06F 3/14* (2006.01)
*H04L 12/18* (2006.01)

(52) U.S. Cl.
CPC .......... *H04L 12/1895* (2013.01); *H04L 12/189* (2013.01)
USPC ............................ 715/771; 715/774; 715/864

(58) Field of Classification Search
USPC .................................. 715/771, 764, 864, 774
See application file for complete search history.

(56) References Cited

U.S. PATENT DOCUMENTS

| | | | |
|---|---|---|---|
| 5,893,091 A * | 4/1999 | Hunt et al. ............................ | 1/1 |
| 6,031,577 A * | 2/2000 | Ozkan et al. ................... | 348/465 |
| 6,222,520 B1 * | 4/2001 | Gerszberg et al. ............ | 715/784 |
| 6,349,340 B1 * | 2/2002 | Dyer et al. ..................... | 709/231 |
| 6,421,694 B1 * | 7/2002 | Nawaz et al. .................. | 715/234 |
| 6,510,553 B1 * | 1/2003 | Hazra .............................. | 725/87 |
| 6,522,342 B1 * | 2/2003 | Gagnon et al. ................. | 715/716 |
| 6,742,042 B1 * | 5/2004 | Holden et al. .................. | 709/230 |
| 7,020,710 B2 * | 3/2006 | Weber et al. .................... | 709/232 |
| 7,774,815 B1 * | 8/2010 | Allen ............................... | 725/80 |
| 7,861,275 B1 * | 12/2010 | Vellaikal et al. .............. | 725/109 |
| 2003/0046431 A1 * | 3/2003 | Belleguie ...................... | 709/246 |
| 2003/0167467 A1 * | 9/2003 | Allen et al. ...................... | 725/47 |
| 2004/0003412 A1 * | 1/2004 | Halbert .......................... | 725/112 |
| 2004/0031058 A1 * | 2/2004 | Reisman ........................ | 725/112 |
| 2004/0031061 A1 * | 2/2004 | McCalla et al. ............... | 725/135 |
| 2004/0078814 A1 * | 4/2004 | Allen ............................... | 725/47 |
| 2004/0148636 A1 * | 7/2004 | Weinstein et al. ............. | 725/113 |
| 2004/0244058 A1 * | 12/2004 | Carlucci et al. ............... | 725/135 |

(Continued)

FOREIGN PATENT DOCUMENTS

| | | |
|---|---|---|
| JP | 2009543417 A | 12/2009 |
| WO | 2006/124567 | 11/2006 |
| WO | 2008/004189 | 1/2008 |

OTHER PUBLICATIONS

International Search Report, PCT/US2009/030844, International Searching Authority, Apr. 14, 2009, European Patent Office.

(Continued)

*Primary Examiner* — Tadeese Hailu
*Assistant Examiner* — Eric J Bycer
(74) *Attorney, Agent, or Firm* — The Marbury Law Group, PLLC

(57) ABSTRACT

Ticker functionality provides filtering and displaying information relevant to a user. The ticker can be employed to parse information from a broadcast stream and insert the information into a ticker display area. The information presented in the display area can be animated in order to maximize and control the amount of information available to the user. The information offered in the ticker is interactive so that it allows the user to customize this abbreviated data and how the data is presented.

25 Claims, 10 Drawing Sheets

(56) References Cited

U.S. PATENT DOCUMENTS

| | | | |
|---|---|---|---|
| 2005/0039136 A1* | 2/2005 | Othmer | 715/774 |
| 2005/0094032 A1* | 5/2005 | Rogitz | 348/553 |
| 2005/0120369 A1* | 6/2005 | Matz | 725/40 |
| 2005/0152366 A1* | 7/2005 | Heuck | 370/390 |
| 2005/0154996 A1* | 7/2005 | Othmer | 715/774 |
| 2006/0064716 A1* | 3/2006 | Sull et al. | 725/37 |
| 2006/0087457 A1* | 4/2006 | Rachwalski et al. | 341/50 |
| 2006/0168624 A1 | 7/2006 | Carney et al. | |
| 2006/0236257 A1* | 10/2006 | Othmer et al. | 715/774 |
| 2006/0236258 A1* | 10/2006 | Othmer et al. | 715/774 |
| 2006/0268927 A1* | 11/2006 | Rodgers | 370/464 |
| 2007/0022447 A1* | 1/2007 | Arseneau et al. | 725/74 |
| 2007/0157251 A1* | 7/2007 | Shrivastava et al. | 725/60 |
| 2007/0180489 A1* | 8/2007 | Joseph et al. | 725/135 |
| 2008/0062318 A1* | 3/2008 | Ellis et al. | 348/564 |
| 2008/0083000 A1* | 4/2008 | Orrell et al. | 725/53 |
| 2008/0103875 A1* | 5/2008 | Kokernak et al. | 705/10 |
| 2009/0310020 A1* | 12/2009 | Vrijsen | 348/564 |

OTHER PUBLICATIONS

Written Opinion, PCT/US2009/030844, International Searching Authority, Apr. 14, 2009, European Patent Office.

International Preliminary Report on Patentability, PCT/US2009/030844, International Preliminary Examining Authority, European Patent Office, Mar. 19, 2010.

* cited by examiner

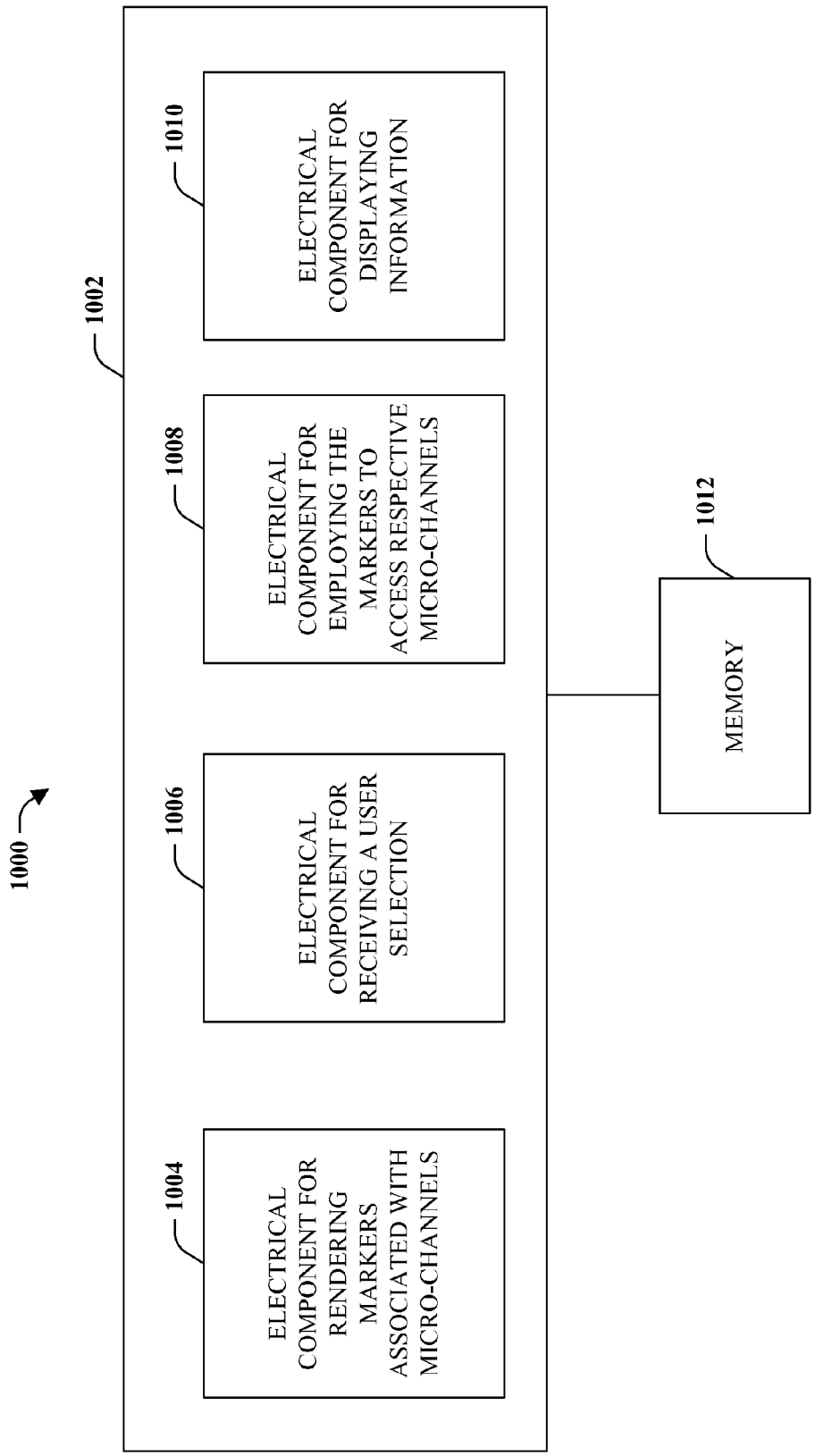

INTERACTIVE TICKER

BACKGROUND

1. Field

The following description relates generally to content distribution systems and more particularly to content delivery and content receipt over a digital broadcast network.

2. Background

A digital broadcast network is a one-way delivery method to client-side software located on a user device. Datacast services provide data over a digital broadcast network to be used by the client-side software. The data provides a user-experience through the client software associated with the datacast service.

Many devices have a small-screen format that presents a challenge to offering data intensive services. Linear, entertainment-based services are easily offered with platform capabilities, but there is difficulty in offering an optimized user experience within the context of a service that consists of large amounts of data. An example is a sports-based service, which might consist of a dozen or more sports, only some of which are of interest to any single user. Therefore, the challenge continues to be how to present relevant information within the limits of a small-screen format when there is a large amount of possibly interesting data.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with functionality for filtering and displaying information relevant to a user (e.g., recipient) of a datacast service. The functionality parses information from a broadcast stream and inserts the information into a display area. The information pulled from the stream can be selected or requested by a user through a filtering mechanism. The information offered can become interactive to a degree that it allows the user to customize this abbreviated data and how it is presented, such as in a dedicated area of the screen, which can include animated information.

An aspect relates to a method for rendering information from a micro-channel. The method includes rendering markers that are respectively associated with micro-channels on a multicast stream of data in a predetermined area of a display. The method further includes receiving a user selection for a first marker and employing the markers to access respective micro-channels. The information contained in the respective micro-channel can be displayed in a dedicated display area.

In a related aspect is a device for rendering information from a micro-channel. The device includes a computer platform having a memory and a processor wherein the memory stores information related to decisions made by the processor. Also included is a data formatter that assigns markers that are respectively associated with micro-channels on a multicast stream. The device further includes a display module that displays the markers in a predetermined area of a display and a selector module that receives a user selection. Further included is a rendering module that employs the markers to access respective micro-channels, wherein the display module displays information contained in the respective micro-channel in the dedicated area of the display.

Another aspect relates to an apparatus for selectively rendering information from a micro-channel. The apparatus includes a means for rendering markers that are respectively associated with micro-channels on a multicast stream of data and a means for receiving a user selection for a first marker. Also included in the apparatus is a means for employing the markers to access respective micro-channels and a means for displaying information contained in the respective micro-channel in a dedicated display area.

In a wireless communication system, a related aspect is an apparatus that includes a processor. The processor is configured to render markers that are respectively associated with micro-channels on a multicast stream of data. The processor can further be configured to receive a user selection for a first marker and employ the first marker to access a respective micro-channel. Information contained in the respective micro-channel can be displayed in a dedicated display area.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 10 illustrates an example system that facilitates presenting relevant information within the limits of a small-screen format.

DETAILED DESCRIPTION

Figure 1:
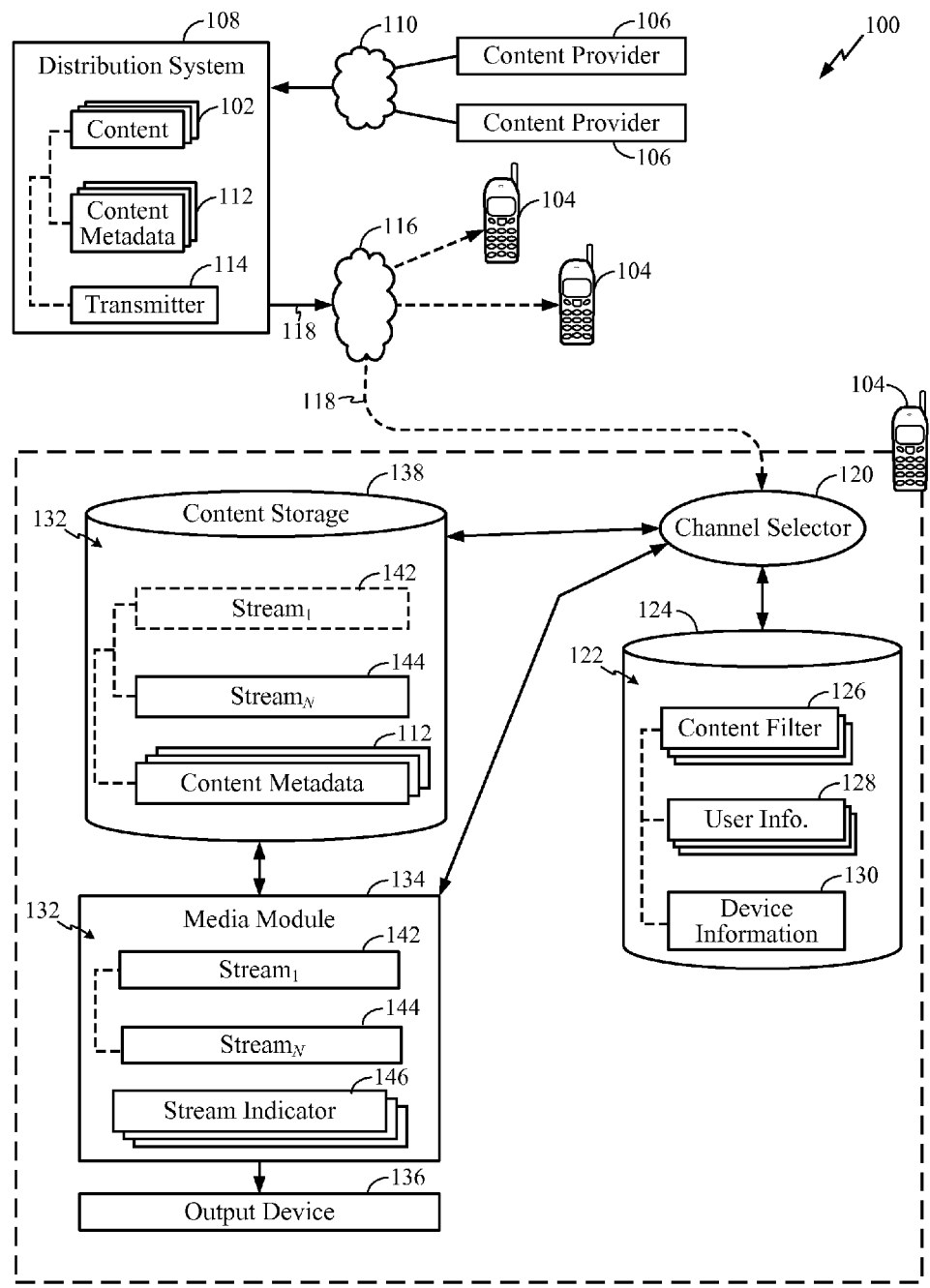
FIG. 1 illustrates a system that enables selective delivery and selective acceptance of content.

Various embodiments are now described with reference to the drawings. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, client, client device, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules and/or may not include all of the devices, components, modules discussed in connection with the figures. A combination of these approaches may also be used.

Referring to FIG. 1, illustrated is a system 100 that enables selective delivery and selective acceptance of content 102, which can be presented in an animated and interactive manner, on one or more wireless devices 104. System 100 can include one or more content providers 106 operable to provide one more pieces of content 102 to distribution system 108, such as through a first network 110. Distribution system 108 is operable to deliver one or more multicast streams of content 102, along with one or more content metadata 112 associated with each multicast stream of content 102, to the one or more wireless devices 104. Such content can be delivered as individual streams of data, wherein a complete content set can include multiple streams of data. For example, distribution system 108 may include a transmitter 114 and/or the second network 116, wherein transmitter 114 is operable to generate a one-to-many transmission 118 of content 102 and/or content metadata 112 for delivery to one or more wireless devices 104 through second network 116. The content 102 and/or content metadata 112 can be divided or partitioned into multiple streams or multiple channels and one or more of the channels can be selectively received and combined (if more than one is selected) for presentation at a respective wireless device 104.

Upon accessing transmission 118, each wireless device 104 is operable to execute a channel selector 120, which can be configured to determine selected ones of the one or more channels of content 102 in transmission 118 to download to wireless device 104 based on one or more selection parameters 122 within a selection database 124. Selection parameters 122 may include, but are not limited to, data such as one or more content filters 126 (e.g., relevant information contained in a stream), one or more data representing user information 128 (e.g. preferences), and/or one or more data representing device information 130 (e.g. capabilities, limitations, display size, audio functionality). Selection parameters 122 can be unique to, and/or customized for, each respective wireless device 104 and/or each respective user of each wireless device 104. As such, in some aspects, each wireless device 104 may download a different set of one or more streams of content 102 within the same transmission 118. Thus, in some aspects, one or more selection parameters 122 allow channel selector 120 to download one or more selected streams of content 132 of interest to a respective user of the respective wireless device 104 based on a match between one or more of the respective content metadata 112 and one or more of the selection parameters 122.

Further, for example, in aspects where selected content 132 comprises a real time or live content, channel selector 120 may forward selected content 132 to a media module 134 for presentation through an output device 136. In other aspects, for example, where selected content 132 comprises a non-real-time content, channel selector 120 may forward selected content 132 to be cached or saved in a content storage 138. In the non-real-time case, media module 134 is operable to access content storage 138 at any time to retrieve and cause a presentation through output device 136 of the selected content 132.

Output device 136, in combination with media module 134, is operable to generate selected content 132 as a program or presentation for consumption by a user of wireless device 104. Each program or presentation may comprise a combination of one or more streams of selected content 132 (labeled Stream$_1$ 142 through Stream$_N$ 144, where N is an integer) or might comprise a single stream of content. The streams of content 142, 144 can be associated with one more of the content metadata 112 corresponding to each stream 142, 144.

In accordance with some aspects, output device 136 can present an interactive ticker and related information in a dedicated display area. The interactive ticker can include data from one or multiple streams of data. As the ticker is presented, a user can select (e.g., click on) one or more items from the ticker. The selected item can be automatically matched to related content, such as through a tag associated with each item that can be selected from the ticker. The tag can include a pointer or a locating means for readily accessing the information related to the selected item, which can be output in a readily perceivable format. The ticker and the output information can be presented in a dedicated section on a screen to allow the user to perceive a primary experience (e.g. application) while also viewing the ticker and/or output information at substantially the same time. As such, a user is presented relevant information within the limits of a small-screen format.

In accordance with some aspects, first network 110 and second network 116 provide respective communication links between the various components and/or entities of system 100. In some aspects, first network 110 and second network 116 may comprise independent networks, while in other aspects they may comprise inter-related networks. Generally, first network 110 and second network 116 each may comprise any one or any combination of one or more data networks and/or one or more communications networks. For example, in some aspects, first network 110 may comprise a public communications network, such as the Internet, and second network 116 may comprise a subscription based one-to-many network, such as a multicast network such as a Forward Link Only (FLO) network, including the MediaFLO™ System available from QUALCOMM, Incorporated, of San Diego, Calif. In other aspects, first network 110 and second network 116 may include one or a combination of other networks, such as: a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio network.

Further, examples of telephone networks that may be included in some aspects of first network 110 and/or second network 116 include one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (IX) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 2:
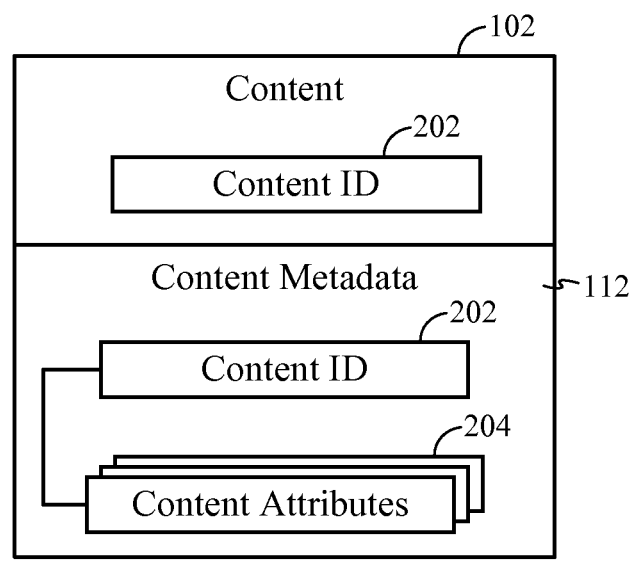
FIG. 2 illustrates a schematic diagram of an aspect of the content of FIG. 1

Referring to FIG. 2, illustrated is a schematic diagram of an aspect of the content of FIG. 1. Content 102 as used herein may comprise, but is not limited to, at least one of video, audio, multimedia content, real-time content, non-real-time content also referred to as "clips," scripts, programs, scheduled downloads, updates (both time-sensitive and non-time-sensitive) or any other type of data or object operable to be distributed to and executed or presented by wireless device 104. For example, content 102 may include one or any combination of subscribed to programming, ad hoc and/or on-demand received programming, and/or advertising or any other form of content added to, inserted within and/or presented simultaneously with or in place of other content. Additionally, for example, content 102 may comprise, but is not limited to, a television show, a video, a movie, a song, interactive data such as World Wide Web pages and links, and so forth. Further, content 102 may comprise a unique content identifier (ID) 202, such as one or any combination of a letter, a number, a name, a file name, a file path, and so on, associated with the respective piece of content.

Additionally, at least one of the multitude of content 102 is associated with one or more content metadata 112. For instance, one or more of the "content suppliers" may define the respective content metadata 112, and associate the content metadata 112 with the respective content. As used herein, the term "content supplier" may include one or any combination of a content provider such as content provider 106, a content retailer, a billing and customer service provider, and a media distributor such as distribution system 108 or other providers. Content metadata 112 comprises any data that describes and/or is associated with each respective piece of content 102. For example, content metadata 112 may comprise, but is not limited to, one or any combination of content ID 202 and one or more content attributes 204, such as a category, a name, a content length, a content type, associated stream indicator 146, a code, an identifier, a theme, a genre, an intended audience and/or market, a script, a content filter identifier, a cuing protocol parameter, a related audience and/or market, and/or any metadata relating to the corresponding content. One or more content metadata 112 may be separate from, attached to or embedded within the respective content 102. In some aspects, for example, when content 102 and content metadata 112 are separate, they each may comprise or point to the same content ID 202, for example, to enable the respective content metadata to be related to the respective content.

Figure 3:
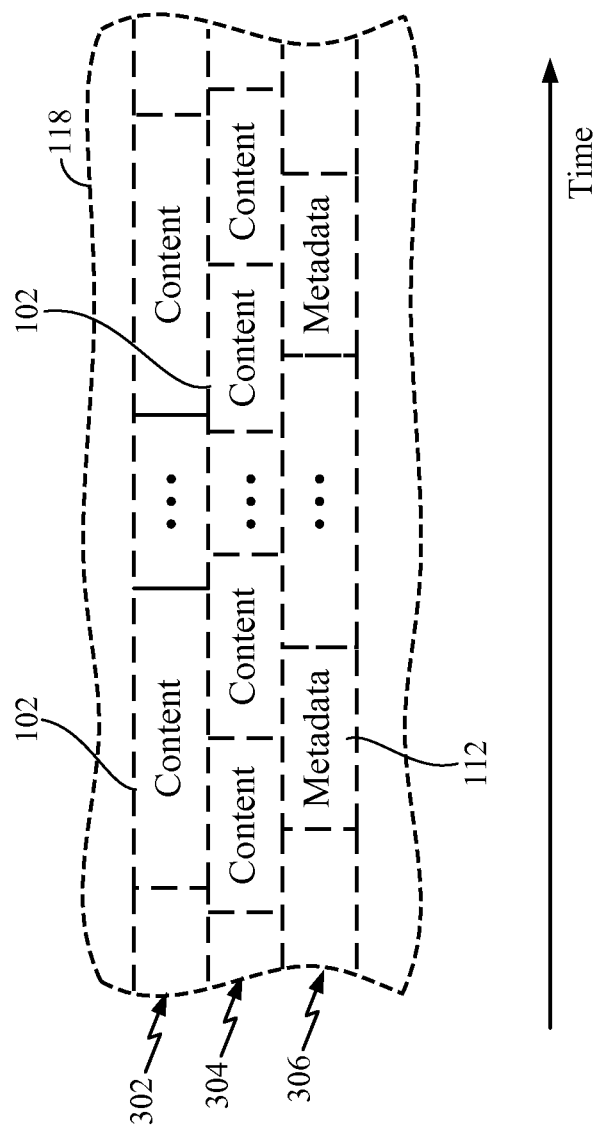
FIG. 3 illustrates a schematic diagram of an aspect of the transmission of a multitude of streams of the multitude of content of FIG. 1.

Referring to FIG. 3, illustrated is a schematic diagram of an aspect of the transmission of a multitude of streams of the multitude of content of FIG. 1. Transmission 118 may provide one or more channels or services 302, 304, 306 of content 102 and content metadata 112 to each wireless device 104 (FIG. 1) for consumption by a respective end user. In some aspects, for example, each transmission 118 may comprise a one-to-many transmission in a Forward Link Only (FLO™) system, such as the MediaFLO™ system available from QUALCOMM, Incorporated, of San Diego, Calif. In such a system, transmission 118 comprises a flow or a logical stream within a "multiplex," which is a set of flows available in a given geographical area. Further, each channel, service, and/or stream 302, 304, 306 carried by transmission 118 can include ticker information. In accordance with some aspects, the ticker information is provided on a single channel or on multiple channels.

Figure 4:
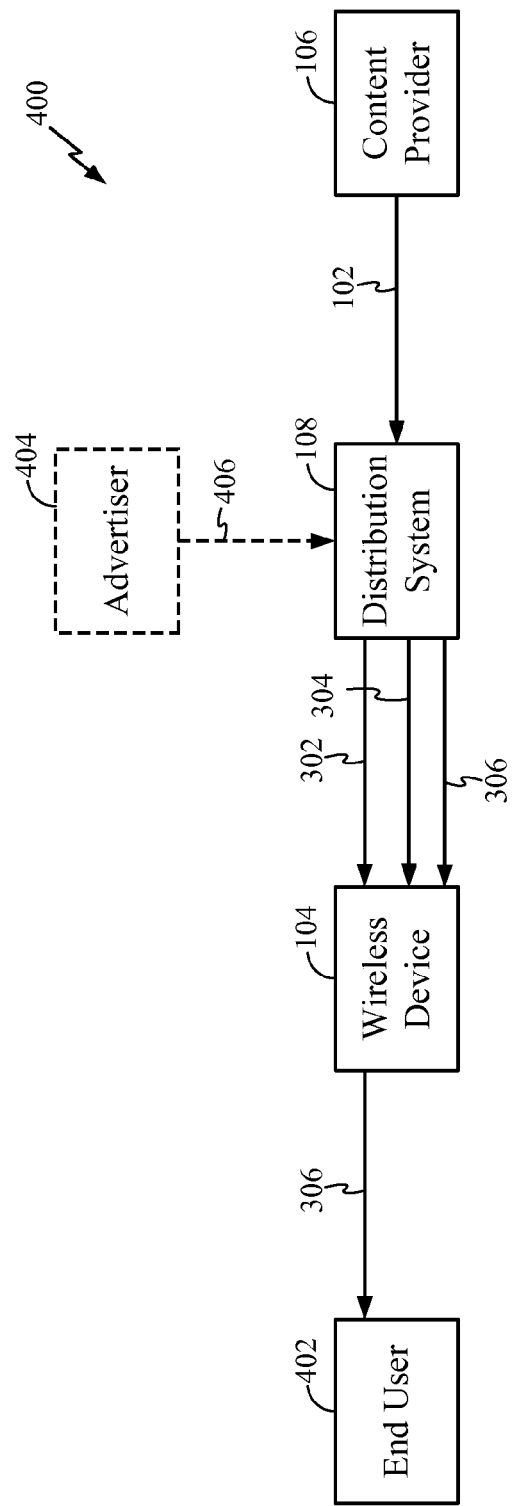
FIG. 4 illustrates a schematic diagram of an aspect of components, including an advertiser, of the system of FIG. 1.

Referring to FIG. 4, illustrated is a schematic diagram of an aspect of components, including an advertiser, of the system of FIG. 1. In some aspects, because the presentation of each service, channel and/or stream 302, 304, 306 (hereinafter referred to as channel) carried by transmission 118 may attract a large number of end users or consumers 402, system 100 may further include one or more advertisers 404 in communication with distribution system 108. Advertiser 404 comprises an entity desiring to present one more pieces of content 102 (FIG. 1) within a channel 406, in the form of one or more advertisements to selected end users 402. For example, in this aspect, a first channel 302 may comprise, but is not limited to, an advertisement.

Figure 5:
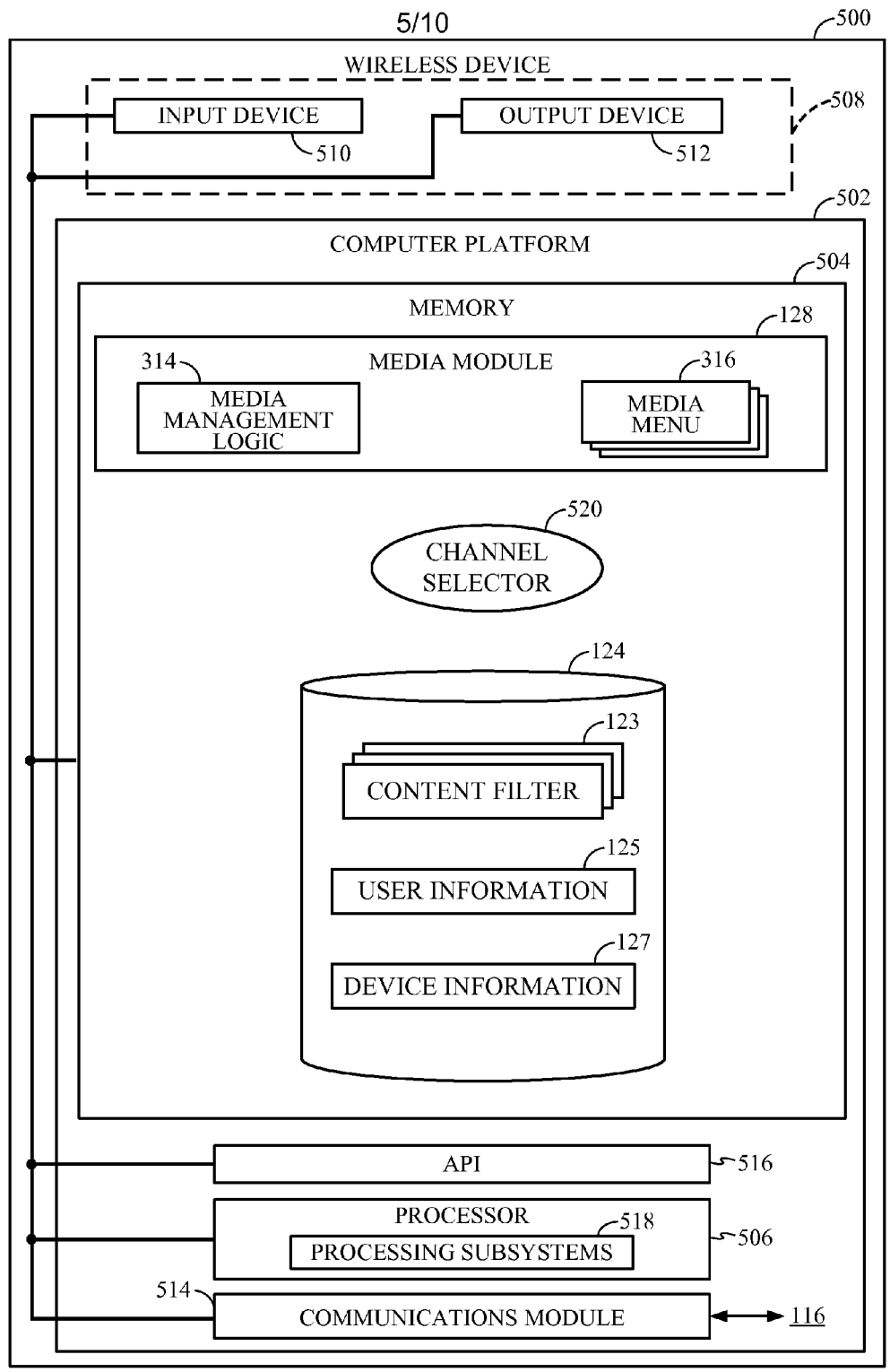
FIG. 5 illustrates a wireless device in accordance with the disclosed aspects.

FIG. 5 illustrates a wireless device 500 in accordance with the disclosed aspects. Wireless device 500 represents wireless device 104 of system 100 (FIG. 1) and is operable to access second network 116 in order to receive transmission 118 and/or to communicate with distribution system 108. Each wireless device 500 may comprise a computer platform 502 having a memory 504 operable to store data, logic and applications executable by a processor 506. A user may interact with wireless device 500 and its resident applications through one or more user interfaces 508, which may include one or more input devices 510 and one or more output devices 512.

Additionally, wireless device 500 may exchange communications with external devices and/or networks through a communications module 514.

It should be noted that although wireless devices 500 may be illustrated as cellular telephones, any number and combination of types of wireless devices 500 may be included in system 100 of FIG. 1. For example, wireless device 500 may include, but is not limited to, a cellular telephone, a Personal Digital Assistant (PDA) a laptop computer, a two-way pager, a portable gaming device, a portable music device, or any type of computerized, wireless device. The disclosed aspects can accordingly be performed on any form of wireless device or computer module, including a wired or wireless communication portal, including without limitation, wireless modems, PCMCIA cards, access terminals, personal computers, telephones, or any combination or sub-combination thereof.

Computer platform 502 is operable to transmit data across a network, such as first network 110 (FIG. 1) and/or second network 116 (FIG. 1), and is operable to receive and execute routines and applications and optionally display data generated within wireless device 500 or received from any network device or other computer device connected to the network or connected to wireless device 500. Computer platform 502 may be embodied in, for example, one or any combination of hardware, firmware, software, data and executable instructions.

Memory 504 may comprise one or any combination of volatile and nonvolatile memory, such as read-only and/or random-access memory (RAM and ROM), EPROM, EEPROM, flash cards, flash memory cells, an electronic file system, and any memory common to computer platforms. Further, memory 504 may include one or more of any secondary or tertiary storage device, such as magnetic media, optical media, tape, or soft or hard disk, including removable memory mechanisms.

Further, processor 506 may be one or more of an application-specific integrated circuit ("ASIC"), a chipset, a processor, a logic circuit, and any other data processing device. In some aspects, processor 506, or other processor such as an ASIC, may execute an application programming interface (API) layer 516 that interfaces with any resident programs stored in memory 504 of wireless device 500. API 516 is typically a runtime environment executing on the respective wireless device. One such runtime environment is Binary Runtime Environment for Wireless® (BREW®) software developed by QUALCOMM, Incorporated, of San Diego, Calif. Other runtime environments may be utilized that, for example, operate to control the execution of applications on wireless computing devices.

Additionally, processor 506 may include various processing subsystems 518 embodied in hardware, firmware, software, data, executable instructions and combinations thereof, which enable the functionality of wireless device 500 and the operability of wireless device on network 116 of FIG. 1. For example, processing subsystems 518 allow for initiating and maintaining communications, and exchanging data, with distribution system 108 and/or other networked devices. In aspects in which the wireless device 500 is defined as a cellular telephone, for example, processor 506 may additionally include one or a combination of processing subsystems 518, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, vocoder, messaging, graphics, USB, multimedia, etc. For the disclosed aspects, processing subsystems 518 of processor 506 may include any subsystem components that interact with applications executing on computer platform 502 that enable the functionality described herein. For example, processing subsystems 518 may include any subsystem components that receive data reads and data writes from API 516 on behalf of channel selector 520.

Further, communications module 514 may be embodied in hardware, firmware, software, data, executable instructions and combinations thereof, and is operable to enable communications among the various components of wireless device 500, as well as between wireless device 104 and first network 110 and/or second network 116. For example, in cellular telephone aspects, communication module 514 may include the requisite hardware, firmware, software, data, executable instructions and combinations thereof, including transmit and receive chain components for establishing a wireless communication connection.

Further, for example, communication module 514 is operable to receive the plurality of content 102, which can include a ticker application, and the associated respective one or more content metadata 112, if any, from distribution system 108 and forward them to data formatter 608 or provide data formatter 608 with access to them. Similarly, for example, communication module 514 is operable to receive the one or more selection parameters 122 and either forward them to data formatter 608 or provide data formatter 608 with access to them. Subsequently, for example, communications module 514 is operable to forward the selected content 126, respectively, to other device components for further processing.

Additionally, one or more input devices 510 for generating inputs into wireless device, and one or more output devices 512 for generating information for consumption by the user of the wireless device are provided. For example, input device 510 may include a mechanism such as a key or keyboard, a navigation mechanism, a mouse, a touch-screen display, a microphone in association with a voice recognition module, etc. In certain aspects, input device 510 provides an interface for receiving user input, such as to activate or interact with an application or module on the wireless device. Further, for example, output device 512 may include a display, an audio speaker, a haptic feedback mechanism, etc. Further, user interface 508 may comprise one or any combination of input devices 510 and/or output devices 512.

Figure 6:
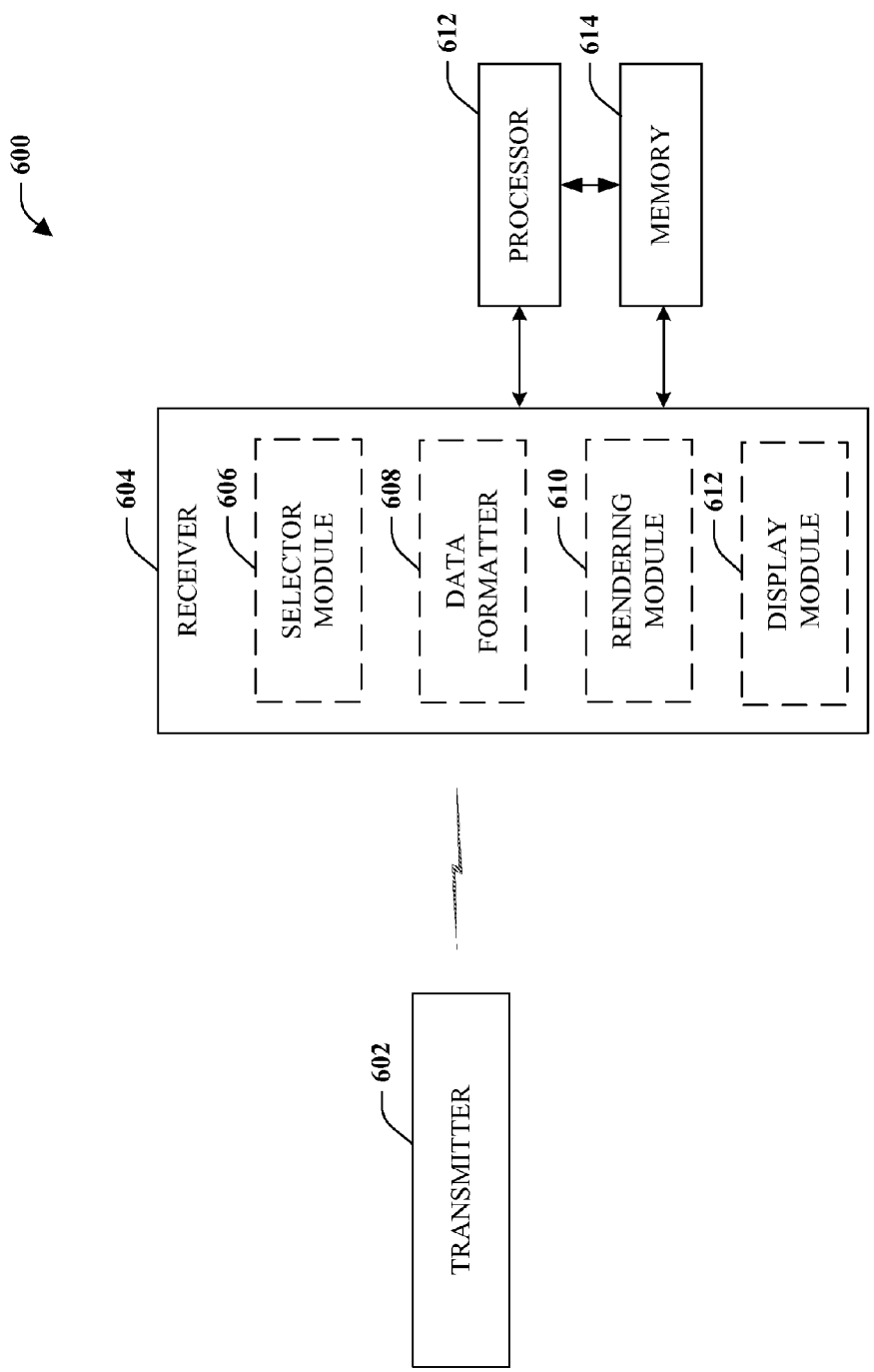
FIG. 6 illustrates a block diagram of an example system for selective filtering and rendering of an interactive ticker.

With reference now to FIG. 6, illustrated is a block diagram of an example system 600 for selective filtering and rendering of an interactive ticker. System 600 can be configured to parse information from a broadcast stream and insert the parsed information into a ticker display area. The information offered in the ticker can be interactive, providing the user the ability to customize both the data and how that data is rendered within the display area.

In further detail, system 600 includes a transmitter 602 that is in wireless communication with a receiver 604. Transmitter 602 can be configured to transmit multicast streams, wherein at least one of the streams can be dedicated and provisioned for ticker functionality. In accordance with some aspects, the ticker information is included on a single multicast stream, whereby user interactivity involves opening up a single data stream and/or micro-channels associated with that single data stream. In accordance with other aspects, the ticker information is provided on different multicast streams.

To facilitate selective acceptance and rendering of ticker information, receiver 604 includes a selector module 606 that can be configured to receive an instruction relating to information that is of interest to the user. The instruction can include a selection of an item included in a ticker. For example, a user can perceive a first application and a ticker can be displayed in a small section of the display area. A user can be viewing the first application and might also be monitoring the ticker.

Through interaction with the selector module 606, the user can easily navigate though the ticker information and then, if desired, drill into specific content within the micro-channel. Thus, when an item of interest is perceived in the ticker, the user can select that item so that further information relating to that item is presented. In accordance with one aspect, the user can selectively navigate the ticker information until desired content is received. For example, a sports ticker can display information relating to different sports (e.g., football, baseball, soccer, swimming, tennis, golf, and so forth). A user might be interested in the baseball scores and can fast forward through the ticker information until the desired sport (e.g., baseball) is reached. When the user stops fast forwarding, the scores for each baseball game are automatically displayed in a ticker display area. If desired, the user can drill down into more information relating to that game (e.g., player statistics, player information, and so forth).

In accordance with another aspect, the user can skip though the scores until the score for a desired game is located. If additional information is desired, the user can select (e.g., voice command, push button, selection on the screen, and so forth) the desired additional information. For example, once the user perceives the score for the desired game, the user can select that score for additional information that can be displayed as a full screen readout of the entire game (e.g., details, statistics, players, and so forth).

To facilitate rendering the desired information, a data formatter 608 can be configured to selectively tag information within a multicast stream of data received from transmitter 602. Each tag can represent a micro-channel within a single multicast stream of data or within different multicast streams of data. The tag can associate at least a portion of the multicast stream with another portion of the same, or a different, multicast stream. The information can be tagged with an indicator, pointer, marker or in some other manner, provided system 600 can locate the related information when the tag is selected by a user. Thus, related information does not have to be contained in the same location as the tagged data stream.

For example, the ticker stream can include the current scores for football games. Each game has a tag or ID number. When a user selects (e.g., clicks on) a portion of the ticker (which is associated with the ID), the ID or tag points to and automatically accesses another part of the application to provide, for example, a full game experience that includes the statistics and other information that might be of interest to the user (e.g., player information, schedule of future games, and so forth). It should be understood that the marker or tag can be embedded within the application. Thus, the user perceives a set of data (e.g., scores) but does not perceive the tag or marker.

In accordance with some aspects, there can be a separate stream that is accessed. For example, if a user is interested in football games, a stream (e.g., ticker) that includes all football games can be opened. The ticker can display the games, the teams, or other information. The user can select the item of interest (e.g., game, team), which is associated with a particular ID number. Selection of the item of interest provides interactivity such that the user can drill down to perceive more detailed information, as desired.

Also included is a rendering module 610 that can be configured to insert the parsed information (e.g., the information pointed to) into a ticker display area. A display module 612 can display the markers in a predetermined display area. The information is presented in a dedicated area of the screen, which can be at any location and, in accordance with some aspects, can be moved by the user. In accordance with some aspects, rendered markers are included within a ticker and presented within a first predetermined area of the display. At substantially the same time, another application can be presented at a second predetermined area of the display. For example, the dedicated display area could be in an upper right corner, a lower left corner, along the upper (or lower) display area, or any other place within the display area. The dedicated display area can be an area that is small enough to allow a user to perceive a separate application (e.g., primary experience) running at substantially the same time the information is presented and large enough to allow the user to perceive the ticker information.

Thus, for example, there can be a number of channels being broadcast for the Olympics (such as 30 channels for this example). The Olympic broadcast can be parsed into a number of micro-channels, for example, each micro-channel including a different sporting events and statistics and so forth. One of the channels might be of interest to the user. The user, through interaction with selector module 606 can navigate though the micro-channels and select an item for additional information. Depending on the type of data being transmitted on that micro-channel, the receiver 604 can present the additional information though one or more perceivable means (e.g., audio, visual), to provide the user with the desired information.

System 600 can include a processor 612 operatively coupled to receiver 604 to execute instructions relating to accepting user selections and dynamically displaying information relating to the selections. In accordance with some aspects, processor 612 can execute instructions relating to rendering indicators, wherein each indicator is respectively associated with a micro-channel on a multicast stream, and employing the indicators to access respective micro-channels. Processor 612 can further execute instructions relating to receiving a user selection for a first marker before employing the markers to access respective micro-channels and displaying information contained in the respective micro-channel in a dedicated display area. Processor 612 can be a processor that analyzes and generates information received by receiver 604 and/or can control one or more components of system 600.

A memory 614 can be operatively coupled to processor 612 and/or receiver 604. Memory 614 can store one or more pointers that indicate related information generated by the processor. In accordance with some aspects, memory 614 can store information related to user selections, user preferences, and/or historical information relating to information previously viewed.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 414 of the disclosed embodiments are intended to comprise, without being limited to, these and other suitable types of memory.

Figure 7:
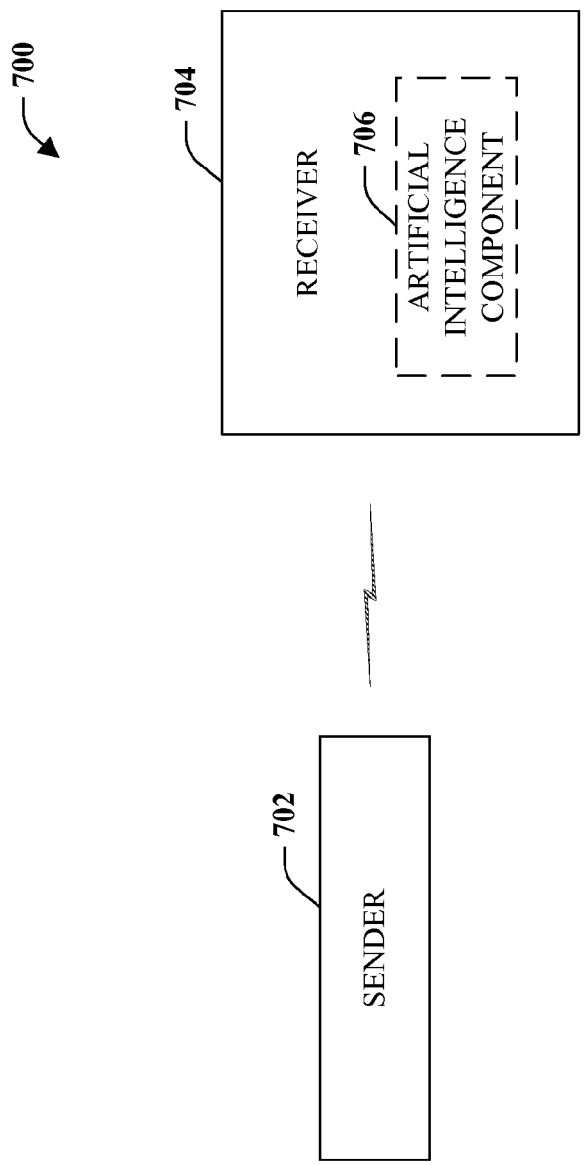
FIG. 7 illustrates an example system that utilizes artificial intelligence to automate one or more of the disclosed aspects.

FIG. 7 illustrates an example system 700 that utilizes artificial intelligence to automate one or more of the disclosed aspects. System 700 can facilitate providing an interactive ticker. In further detail, system 700 includes a sender 702 that can be configured to transmit to receiver 704 one or more multicast streams of data that can include a multitude of micro-channels.

Receiver 704 can selectively associate an identifier (ID) to subsets of each micro-channel, wherein each subset relates to an item(s) that can be selected by a user. At substantially the same time as the selection is made, information associated with the selection is automatically presented in a perceivable manner to the user. The user can perceive the associated information in a dedicated area of a display, through audio means, or through other means.

Receiver 704 can employ artificial intelligence (AI), which can be facilitated by AI component 706 as illustrated. The various embodiments (e.g., in connection with providing an interactive ticker) can employ various AI-based schemes (e.g., machine learning and reasoning, rules-based techniques) for carrying out various aspects thereof. For example, a process for assigning micro-channels within a multicast stream of data with an identifier that points to associated information. The associated information can be automatically presented. In another aspect, based on a user or device state, AI component 706 can infer which data should be associated and/or presented. AI component 706 can dynamically present additional information to a user at substantially the same time as the user selects information from the multicast stream of data. In accordance with some aspects, AI component 706 can monitor usage of an application (e.g., historical data) and automatically display information relating to the historical data by inferring what the user might desire to view.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of accepting scheduled downloads, for example, attributes can be information included with the multicast stream (e.g., types of data), and the classes are categories or areas of interest (e.g., user preferences, historical use of the data, relevance of the data, and so forth).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria, the order in which a user selects portions of a multicast stream, how a user interacts with the ticker application, the number of times a user selects a particular type of data and so on. The criteria can include, but is not limited to, the type of data included in each subset of the multicast stream of data, the content included in each multicast stream of data, device information, user preferences, and so forth.

Figure 8:
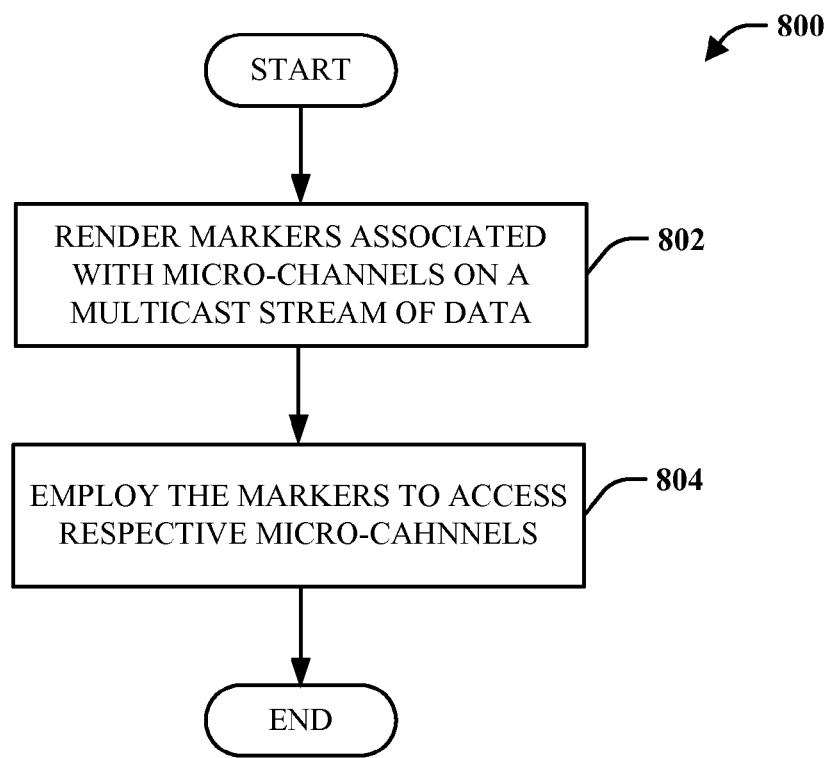
FIG. 8 illustrates a method for providing an interactive ticker.
Figure 9:
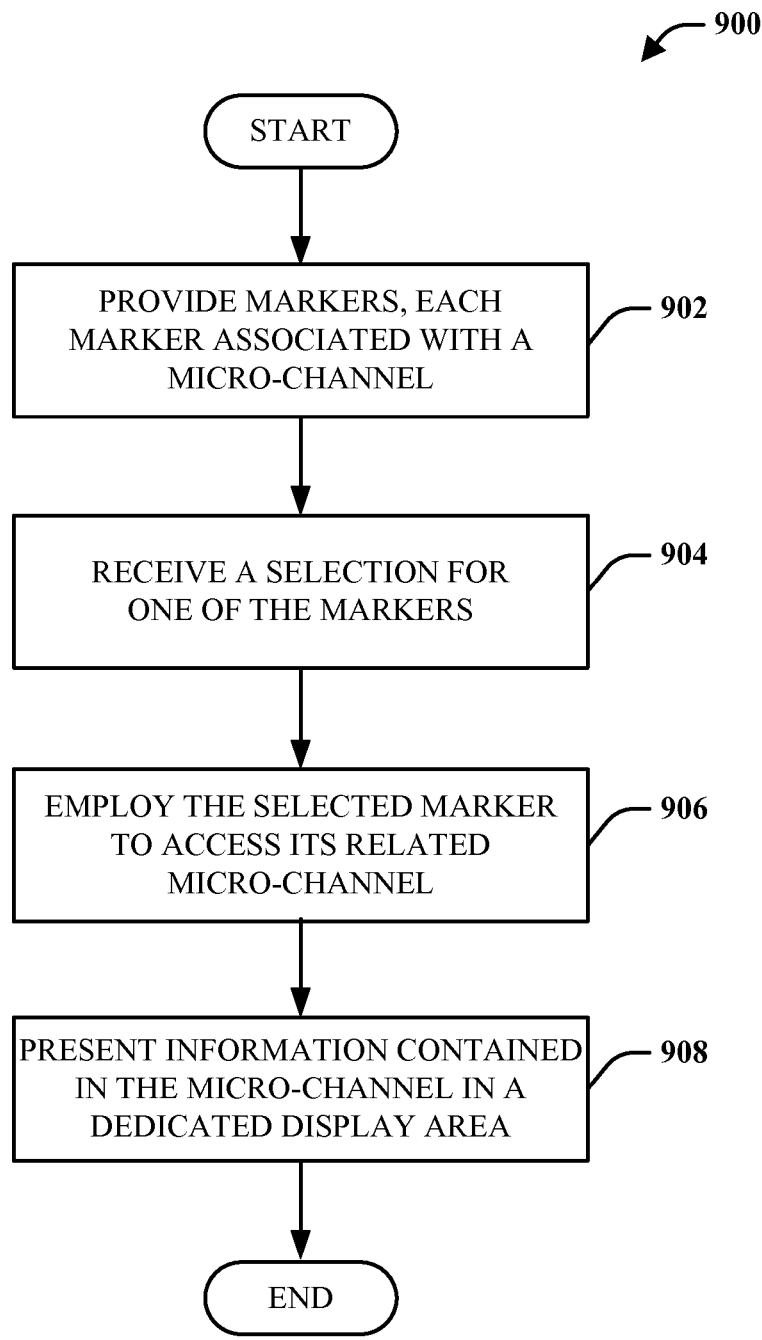
FIG. 9 illustrates a method for providing an interactive ticker in accordance with the various embodiments disclosed herein.

In view of the exemplary systems shown and described above, methodologies that may be implemented in accordance with the disclosed subject matter, will be better appreciated with reference to the flow charts of FIGS. 8 and 9. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 8 illustrates a method 800 for providing an interactive ticker. Method 800 can facilitate filtering and display information relevant to a user. Information can be parsed from a broadcast stream and the information can be inserted into a ticker display area. Further, method 800 can be configured to allow a user to select the most interesting data and such information can be presented in an animated and interactive manner.

Method starts, at 802, when markers are rendered within a broadcast stream on a user device. Each marker can be associated with a micro-channel on a multicast stream of data. The markers can be rendered in such a manner that the marker is readily perceivable, and selectable, by a user. The marker can include an identifier or tag associated with related content (e.g., micro-channel) that might be included within the same multicast stream as the marker, or in a different multicast stream of data.

At 804, the marker is employed to access respective micro-channels. The marker can point to the related content and automatically provide the related content in a perceivable format when a marker is selected. For example, a ticker including stock quotes can be displayed on a user device at substantially the same time as another application is running. A user, perceiving the ticker information that can include stock prices, might desire to view more information relating to a particular stock. The user can select the stock name/price as it is scrolling by in the ticker. At substantially the same time as the stock name/price is selected, a micro-channel can be dynamically accessed, wherein the micro-channel contains further information relating to that particular stock (e.g., high price, low price, percent change, and so forth). In such a manner, a user can interact with the ticker to obtain desired information in a dynamic manner.

FIG. 9 illustrates a method for providing an interactive ticker in accordance with the various embodiments disclosed herein. Method can facilitate a user interacting with a ticker to obtain relevant information within the limits of a small-screen format. A user can select areas or information of interest and method 900 can parse a multicast stream for the selected information.

In further detail, method 900 starts, at 902, when markers associated with respective micro-channels are provided. The micro-channels can be included on a multicast stream of data. The markers can be contained in a ticker, which can be presented on a portion of a display area of a user device. The ticker can be presented as a scrolling ticker or in other formats, provided such formats are readily perceivable and intuitive. The rendered markers can be within a ticker that can be presented on a display at substantially the same time as another application is presented, such as a primary experience.

At 904, a selection for one of the markers is received. The selection can be made by a user selecting the marker presented in the ticker. It should be understood that the marker might not be readily perceivable by the user but information associated with the marker is readily perceivable. For example, a user might see the name of their favorite sports team within the ticker, however, the user does not see the link or association to the micro-channel.

Thus, a user can be viewing a primary experience and a ticker is provided at the bottom (or another place) on the display. The user has the ability to scroll through the information included in the ticker (e.g., sports scores, stock quotes, or other information provided in a ticker format) while simultaneously watching the primary experience. Thus, the user can perceive both the primary experience and the ticker information without changing screens. The user can fast forward through the ticker information, which can appear as a stream of data. When the user perceives a portion of the ticker that is of interest, a selection can be made, such as by clicking on that portion of the ticker. Thus, interactivity is provided that allows the user to drill down into the data in order to perceive more detailed information.

At substantially the same time as the marker is selected, the marker is employed to access its related micro-channel, at 906. The micro-channels can be in the same multicast stream of data or in different multicast streams of data. The markers can point to the micro-channel that contains related information. Thus, the information contained in the marker that points to associated content is used to access that associated content.

At 908, the information contained in the micro-channel (e.g., associated content) is presented in dedicated display area. The displayed information is a subset of data parsed from the respective micro-channel. The dedicated display area can be a small section of the total display area, which can be selected by the user. If the selected area is not ideal, in accordance with some aspects, the user can selectively change the display area by selecting a frame or window around the area and moving the area to another location or through other means.

With reference to FIG. 10, illustrated is an example system 1000 that facilitates presenting relevant information within the limits of a small-screen format. For example, system 1000 may reside at least partially within a mobile device. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. For instance, logical grouping 1002 may include an electrical component for rendering markers that are respectively associated with micro-channels on a multicast stream of data. The rendered markers can be included within a ticker that can be presented on a display at substantially the same time as another application is presented. Also included can be an electrical component for receiving a user selection 1006. The selection can be for one of the markers.

Further, logical grouping 1002 can comprise an electrical component for employing the markers to access respective micro-channels 1008. The markers can point to the micro-channel that contains related information. The respective micro-channels can be within the same multicast stream of data or within different multicast streams of data. Also included can be an electrical component for displaying information contained in the respective micro-channel in a dedicated display area 1010. The displayed information is a subset of data parsed from the respective micro-channel.

Additionally, system 1000 can include a memory 1012 that retains instructions for executing functions associated with electrical components 1004, 1006, 1008 and 1010 or other components. While shown as being external to memory 1012, it is to be understood that one or more of electrical components 1004, 1006, 1008 and 1010 may exist within memory 1012.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for rendering information from a micro-channel on a wireless device, comprising:
    receiving a wirelessly-transmitted multicast stream of data comprising a plurality of micro-channels, wherein each micro-channel is associated with a different respective event, and wherein each micro-channel comprises related content within the multicast stream of data and further wherein the related content is associated with the respective event;
    individually parsing a plurality of markers from the received multicast stream of data;
    respectively assigning each marker to one of the plurality of micro-channels of the received multicast stream of data by inferring an association with the respective one of the plurality of micro-channels based at least in part on historical usage data of the wireless device;
    rendering the markers parsed from the multicast stream of data in a predetermined area of a display;
    receiving a user selection for a first marker associated with a first micro-channel;
    employing the selected first marker to access the first micro-channel from the multicast stream of data; and
    displaying content of the first micro-channel in a dedicated display area.

2. The method of claim 1, wherein the displayed content is a subset of data parsed from the first micro-channel.

3. The method of claim 1, wherein the rendered markers are included within a ticker that can be presented on the predetermined area of the display at substantially the same time that another application is presented on a second predetermined area of the display.

4. The method of claim 1, wherein the dedicated display area comprises a section of a total display area, and wherein the section is movable by user input.

5. The method of claim 1, wherein the first micro-channel can be dynamically accessed via user input to obtain additional information.

6. The method of claim 1, wherein an item with additional information can be selected by receiving user input for navigating through the plurality of micro-channels.

7. The method of claim 1, wherein the rendered markers each comprise information related to the content of the respectively assigned micro-channel.

8. A device for rendering information from a micro-channel, comprising:
    a memory;
    a display;
    a user input device; and
    a processor coupled to the memory, the display, and the user input device, wherein the processor is configured with processor-executable instructions to perform operations comprising:
        receiving a wirelessly-transmitted multicast stream of data comprising a plurality of micro-channels, wherein each micro-channel is associated with a different respective event, and wherein each micro-channel comprises related content within the multicast stream of data and further wherein the related content is associated with the respective event;
        individually parsing a plurality of markers from the received wirelessly-transmitted multicast stream of data;
        respectively assigning each marker to one of the plurality of micro-channels of the received wirelessly-transmitted multicast stream of data by inferring an association with the respective one of the plurality of micro-channels based at least in part on historical usage data of the device;
        rendering the plurality of markers in a predetermined area of the display;
        receiving a user selection of a first marker associated with a first micro-channel;
        employing the selected first marker to access the first micro-channel; and
        displaying content of the first micro-channel in a dedicated area of the display.

9. The device of claim 8, wherein the processor is configured with processor-executable instructions to perform operations such that displaying content of the first micro-channel comprises displaying a subset of data parsed from the first micro-channel.

10. The device of claim 8, wherein the processor is configured with processor-executable instructions to perform operations such that the rendered markers are included within a ticker that can be presented on the predetermined area of the display at substantially the same time as another application is presented.

11. The device of claim 8, wherein the processor is configured with processor-executable instructions to perform operations such that the rendered markers each comprise information related to the content of the respectively assigned micro-channel.

12. The device of claim 8, wherein the processor is configured with processor-executable instructions to perform operations such that the dedicated area of the display comprises a section of a total display area, wherein the section is movable by user input.

13. The device of claim 8, wherein the processor is configured with processor-executable instructions to perform operations further comprising dynamically accessing the first micro-channel based on user input to obtain additional information.

14. An apparatus for selectively rendering information from a micro-channel, comprising:
    means for receiving a wirelessly-transmitted multicast stream of data comprising a plurality of micro-channels, wherein each micro-channel is associated with a different respective event, and wherein each micro-channel comprises related content within the multicast stream of data and further wherein the related content is associated with the respective event;
    means for individually parsing a plurality of markers from the received multicast stream of data;
    means for respectively assigning each marker to one of the plurality of micro-channels of the received multicast stream of data by inferring an association with the respective one of the plurality of micro-channels based at least in part on historical usage data of the apparatus;

means for rendering the markers that are respectively associated with the micro-channels;

means for receiving a user selection for a first marker associated with a first micro-channel;

means for employing the first marker to access the first micro-channel; and means for displaying content of the first micro-channel in a dedicated display area.

15. The apparatus of claim 14, wherein means for displaying content of the first micro-channel comprises means for displaying a subset of data parsed from the first micro-channel.

16. The apparatus of claim 14, further comprising means for including the rendered markers within a ticker that can be presented on a display at substantially the same time as another application is presented.

17. The apparatus of claim 14, wherein the rendered markers each comprise information related to the content of the respectively assigned micro-channel.

18. The apparatus of claim 14, wherein means for displaying content of the first micro-channel in a dedicated display area comprises means for displaying content of the first micro-channel in a section of a total display area, wherein the section is movable by user input.

19. The apparatus of claim 14, further comprising means for dynamically accessing the first micro-channel based on user input to obtain additional information.

20. A non-transitory computer readable storage medium having stored thereon processor-executable instructions configured to cause a processor of a wireless communication apparatus to perform operations comprising:

receiving a wirelessly-transmitted multicast stream of data comprising a plurality of micro-channels, wherein each micro-channel is associated with a different respective event, and wherein each micro-channel comprises related content within the multicast stream of data and further wherein the related content is associated with the respective event;

individually parsing a plurality of markers from the received multicast stream of data;

respectively assigning each marker to one of the plurality of micro-channels of the received multicast stream of data by inferring an association with the respective one of the plurality of micro-channels based at least in part on historical usage data of the wireless communication apparatus;

rendering the markers parsed from the multicast stream of data;

receive receiving a user selection for a first marker, wherein the first marker is associated with a first micro-channel;

employing the selected first marker to access the first micro-channel from the multicast stream of data; and displaying content of the first micro-channel in a dedicated display area.

21. The non-transitory computer-readable storage medium of claim 20, wherein the stored processor-executable instructions are configured to cause the wireless communication apparatus processor to perform operations such that displaying content of the first micro-channel comprises displaying a subset of data parsed from the first micro-channel.

22. The non-transitory computer-readable storage medium of claim 20, wherein the stored processor-executable instructions are configured to cause the wireless communication apparatus processor to perform operations further comprising:

including the rendered-markers within a ticker that can be presented on a predetermined display area at substantially the same time as another application is presented on a second predetermined display area.

23. The non-transitory computer-readable storage medium of claim 15, wherein the stored processor-executable instructions are configured to cause the wireless communication apparatus processor to perform operations such that the rendered markers each comprise information related to the content of the respectively assigned micro-channel.

24. The non-transitory computer-readable storage medium of claim 20, wherein the stored processor-executable instructions are configured to cause the wireless communication apparatus processor to perform operations such that the dedicated display area comprises a section of a total display area, wherein the section is movable by user input.

25. The non-transitory computer-readable storage medium of claim 20, wherein the stored processor-executable instructions are configured to cause the wireless communication apparatus processor to perform operations further comprising dynamically accessing the first micro-channel based on user input to obtain additional information.

* * * * *